United States Patent
Sakashita et al.

(10) Patent No.: US 9,952,872 B2
(45) Date of Patent: Apr. 24, 2018

(54) ARITHMETIC PROCESSING DEVICE AND PROCESSING METHOD OF ARITHMETIC PROCESSING DEVICE

(71) Applicant: FUJITSU LIMITED, Kawasaki-shi, Kanagawa (JP)

(72) Inventors: Sota Sakashita, Kawasaki (JP); Yasunobu Akizuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 15/160,308

(22) Filed: May 20, 2016

(65) Prior Publication Data

US 2016/0357552 A1   Dec. 8, 2016

(30) Foreign Application Priority Data

Jun. 2, 2015   (JP) ................................ 2015-112202

(51) Int. Cl.
*G06F 9/38* (2018.01)

(52) U.S. Cl.
CPC ............ *G06F 9/384* (2013.01); *G06F 9/3814* (2013.01); *G06F 9/3826* (2013.01); *G06F 9/3836* (2013.01); *G06F 9/3857* (2013.01)

(58) Field of Classification Search
None
See application file for complete search history.

(56) References Cited

U.S. PATENT DOCUMENTS

| 5,490,280 | A  | * | 2/1996  | Gupta ................... | G06F 9/3836 712/217 |
| 5,790,821 | A  | * | 8/1998  | Pflum .................. | G06F 9/30145 712/200 |
| 6,360,309 | B1 | * | 3/2002  | Iadonato ............... | G06F 9/3836 712/215 |
| 7,958,336 | B2 | * | 6/2011  | Lahav .................. | G06F 9/3017 712/216 |
| 2003/0014613 | A1 |  | 1/2003 | Soni | |
| 2003/0208672 | A1 | * | 11/2003 | Leenstra ............... | G06F 9/3836 712/200 |

(Continued)

FOREIGN PATENT DOCUMENTS

| JP | 2000-105699 | 4/2000 |
| JP | 2011-8732 | 1/2011 |

*Primary Examiner* — Eric Coleman
(74) *Attorney, Agent, or Firm* — Staas & Halsey LLP

(57) ABSTRACT

An arithmetic processing device includes an instruction decode unit, an instruction execution unit and an instruction hold unit, wherein the instruction hold unit includes; a first holder including a plurality of first entries each configured to hold a decoded instruction; a second holder including a smaller number of second entries than the number of the first entries; a first selector configured to select an instruction to be registered in the second holder from instructions held in the first entries and store identification information that identifies the selected instruction into any of the second entries; and a second selector configured to sequentially select an executable instruction from instructions registered in the second holder, input the selected executable instruction to the instruction execution unit, and detect a dependency between the instruction inputted to the instruction execution unit and the instructions registered in the second holder.

7 Claims, 9 Drawing Sheets

(56) References Cited

U.S. PATENT DOCUMENTS

| | | | |
|---|---|---|---|
| 2005/0068325 A1* | 3/2005 | Lefebvre | G06F 9/3851 345/522 |
| 2008/0040589 A1* | 2/2008 | Sakamoto | G06F 9/30181 712/229 |
| 2010/0332802 A1 | 12/2010 | Fusejima et al. | |

* cited by examiner

ARITHMETIC PROCESSING DEVICE AND PROCESSING METHOD OF ARITHMETIC PROCESSING DEVICE

CROSS-REFERENCE TO RELATED APPLICATION

This application is based upon and claims the benefit of priority of the prior Japanese Patent Application No. 2015-112202, filed on Jun. 2, 2015, the entire contents of which are incorporated herein by reference.

FIELD

The embodiments discussed herein are related to an arithmetic processing device and a processing method of an arithmetic processing device.

BACKGROUND

An arithmetic processing device such as a processor having pipelines divides each of instructions into multiple stages, and then causes the pipelines to execute the respective instructions. Such an arithmetic processing device includes, for example, an instruction decode unit configured to decode an instruction, arithmetic units each configured to execute an inputted instruction, and reservation stations configured to issue the decoded instructions to the arithmetic units (see Japanese Laid-open Patent Publication Nos. 2000-105699 and 2011-8732). The reservation station holds instructions supplied from the decode unit and sequentially inputs the instructions, that become executable, among the held instructions to the arithmetic units. Since the order of instructions to be executed by the arithmetic units is changed by the reservation stations, the efficiency of executing the instructions is made better than in a case where no reservation stations are used.

In addition, when an execution result of a first instruction is used in a second instruction that follows the first instruction, the execution result of the first instruction may bypass a register, and be inputted to the arithmetic unit as input of the second instruction before being stored into the register. In this case, the efficiency of processing instructions is made better than that of the processing without such bypassing.

For example, in a case where a first instruction is inputted to the arithmetic unit, the reservation station detects whether any of instructions held in the reservation stations has a register dependency on the first instruction, and thereby detects a second instruction that will use the execution result of the first instruction. Then, if detecting the second instruction, the reservation station inputs the second instruction to the arithmetic unit and in a cycle next to a cycle where the second instruction is detected. In this next cycle, if the execution result of the first instruction is inputted to the arithmetic unit while bypassing the register, the processing of the second instruction may be completed rapidly.

In addition, when the reservation station detects dependencies of all the instructions held in the reservation stations on the first instruction, time to detect the dependencies between the first instruction and the other instructions also increases as the number of instructions held in the reservation stations increases. Therefore, when the number of instructions held in the reservation stations increases, the detection of dependencies between instructions may not end within the cycle in which the first instruction is inputted to the arithmetic unit. In this case, the second instruction is not inputted to the arithmetic unit in the cycle next to the cycle in which the first instruction is inputted to the arithmetic unit, and accordingly the efficiency of processing the instructions is lower than that in a case where the second instruction is inputted to the arithmetic unit in the cycle next to the cycle in which the first instruction is inputted to the arithmetic unit.

In one aspect, the arithmetic processing device and the processing method of the arithmetic processing device of the present disclosure aim to suppress a decrease in the efficiency of processing instructions even when the number of instructions held in the reservation stations increases.

SUMMARY

According to an aspect of the invention, an arithmetic processing device comprising: an instruction decode unit configured to decode instructions; an instruction execution unit configured to execute the decoded instructions; and an instruction hold unit configured to register the decoded instructions and sequentially input executable instructions among the registered instructions to the instruction execution unit, wherein the instruction hold unit includes a first holder including a plurality of first entries each configured to hold a decoded instruction; a second holder including a smaller number of second entries than the number of the first entries, the second holder configured to register some of the instructions held in the first entries; a first selector configured to select an instruction to be registered in the second holder from instructions held in the first entries and store identification information that identifies the selected instruction into any of the second entries; and a second selector configured to sequentially select an executable instruction from instructions registered in the second holder, input the selected executable instruction to the instruction execution unit, and detect a dependency between the instruction inputted to the instruction execution unit and the instructions registered in the second holder.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments are described with reference to the drawings.

Figure 1:
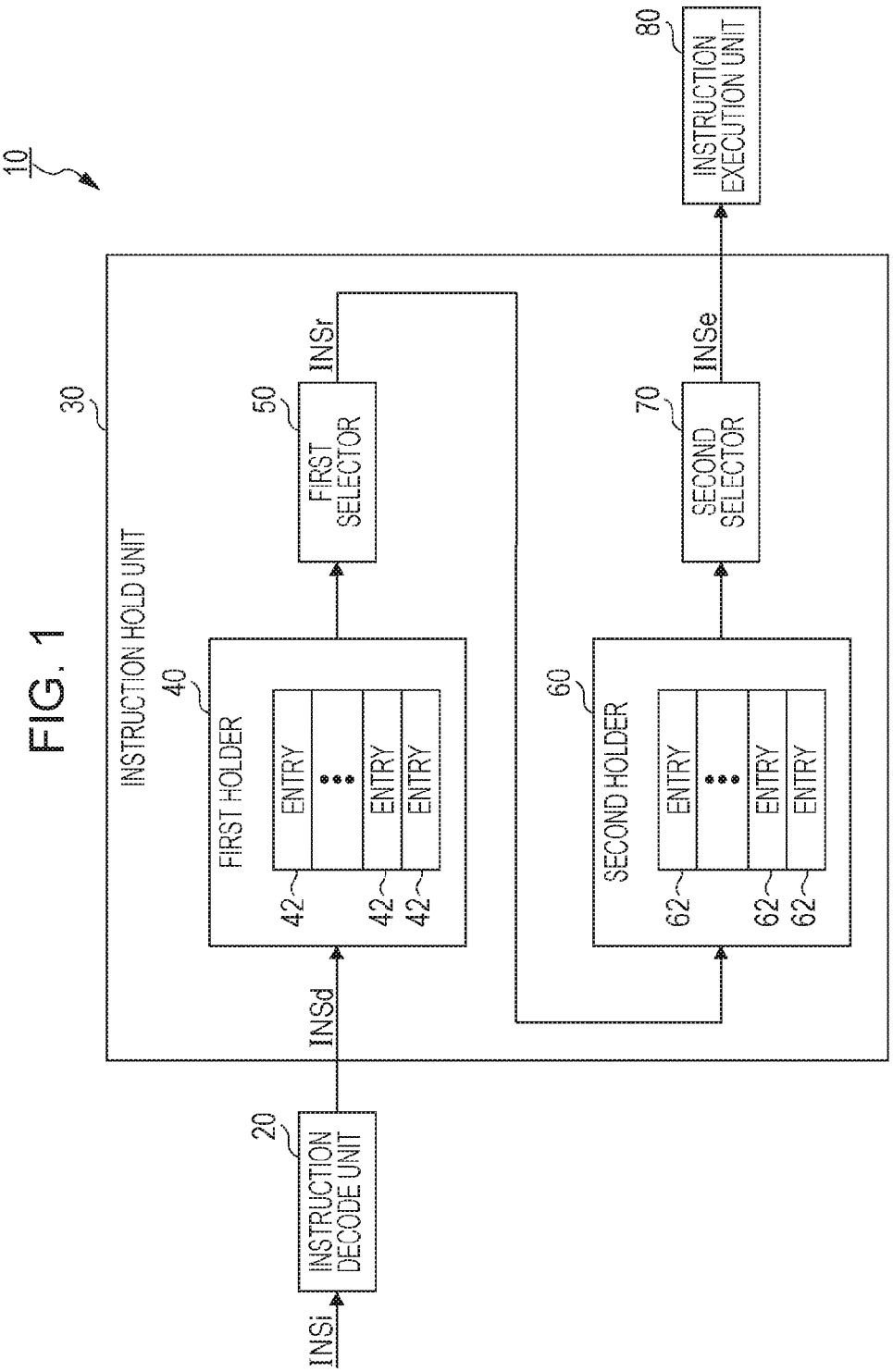
FIG. 1 is a diagram illustrating one embodiment of an arithmetic processing device and a processing method of the arithmetic processing device.

FIG. 1 illustrates one embodiment of an arithmetic processing device and a processing method of the arithmetic processing device. An arithmetic processing device 10 illustrated in FIG. 1 is a processor such as a central processing unit (CPU), a digital signal processor (DSP) or the like, for example. The arithmetic processing device 10 has an instruction decode unit 20 configured to decode an instruction INS (INSi), an instruction hold unit 30 configured to register an instruction INS (INSd) that is decoded by the instruction decode unit 20, and an instruction execution unit 80 configured to execute a decoded instruction INS (INSe).

The instruction decode unit 20 reads the instruction INSi from an instruction cache, not illustrated, to decode the read instruction INSi, for example. Then, the instruction decode unit 20 outputs the decoded instruction INSd to the instruction hold unit 30.

The instruction hold unit 30 has a function as a reservation station of holding instructions INSd supplied from the instruction decode unit 20 and sequentially inputting executable instructions INSe among the held instructions INSd to the instruction execution unit 80. For example, the instruction hold unit 30 has a first holder 40 having multiple entries 42 that hold instructions INSd decoded by the instruction decode unit 20 and a second holder 60 having multiple entries 62, the number of which is smaller than the multiple entries 42. Furthermore, the instruction hold unit 30 has a first selector 50 and a second selector 70.

The first holder 40 holds instructions INSd sequentially received from the instruction decode unit 20, in any (empty entry) of the multiple entries 42. With this, an instruction INSd decoded by the instruction decode unit 20 is registered in the instruction hold unit 30. In addition, each entry 42 holds preference information that indicates the order of instructions INSd issued from the instruction decode unit 20, or the like. Note that efficiency of switching the order of instructions INSe that the instruction execution unit 80 is caused to execute increases as the number of instructions INSd registered in the instruction hold unit 30 (more specifically, the number of entries 42) increases.

The first selector 50 selects an instruction INS (INSr) to be registered in the second holder 60 from the instructions INSd held in the multiple entries 42. For example, the first selector 50 selects an instruction INSr that is decoded earliest by the instruction decode unit 20 among the instructions INSd held in the multiple entries 42, based on the preference information or the like held in each entry 42. Then, the first selector 50 stores identification information indicating the selected instruction INSr in any of the multiple entries 62 in the second holder 60. With this, some instructions INSr of the instructions INSd held in the multiple entries 42 are registered with the second holder 60.

Note that, for example, an instruction INSd corresponding to the instruction INSr registered in the second holder 60 is held in the entry 42 till an instruction INSe corresponding to the instruction INSd is executed by the instruction execution unit 80. More specifically, the first selector 50 copies identification information (to be described below) on the instruction INSr from the entry 42 to the entry 62.

The second holder 60 has the multiple entries 62 the number of which is smaller than the multiple entries 42. Identification information held in the entries 62 is used in detecting a dependency between instructions (hereinafter also referred to as an inter-instruction dependency). Therefore, identification information stored from the entries 42 to the entries 62 may be all information included in the instruction INSr or some information of the instruction INSr including an operand or the like that is desirable for detection of a dependency. In addition, each of the entries 62 holds ready information indicating whether the instruction INSr is in an executable state, or the like.

The second selector 70 sequentially selects an executable instruction INSe among instructions INSr registered in the second holder 60 and inputs the selected instruction INSe to the instruction execution unit 80. Furthermore, the second selector 70 detects a dependency of the instruction INSe inputted to the instruction execution unit 80 (hereinafter referred to as a first instruction INSe) and any of the instructions INSr registered in the second holder 60. For example, the second selector 70 detects whether there is a register dependency between each instruction INSr registered in the second holder 60 and the instruction INSe inputted to the instruction execution unit 80.

The number of the entries 62 in the second holder 60 is smaller than the number of the entries 42 in the first holder 40. Thus, detection of an inter-instruction dependency from the instructions INSr registered in the second holder 60 takes a shorter time than the detection from the instructions INSd registered in the first holder 40. This may improve the efficiency of executing a bypass process of providing output data of the instruction execution unit 80 (execution result of the first instruction INSe) by bypassing before the output data is stored in a register, not illustrated, or the like as input data of a following instruction INS. Consequently, the efficiency of executing the instructions INS may also improve.

In other words, in a method of detecting a dependency among instructions INSd registered in the first holder 40 having numerous entries, the efficiency of performing the bypass process may decrease and the efficiency of processing the instruction INS may decrease. For example, in a configuration in which the first selector 50 and the second holder 60 are omitted, an instruction INS focused when detecting a dependency is an instruction INSd registered in the first holder 40 having the larger number of entries than the second holder 60. Thus, in the configuration in which the first selector 50 and the second holder 60 are omitted, detection of an inter-instruction dependency may not end in a cycle in which a first instruction INS is inputted to the instruction execution unit 80. In this case, in a cycle following the cycle in which the first instruction INS is inputted to the instruction execution unit 80, a second instruction INS is not inputted to the instruction execution unit 80 even if an execution result of the first instruction INS is used in the second instruction INS following the first instruction INS.

In contrast to this, in the instruction hold unit 30, the instruction INS focused when detecting a dependency is the instruction INSr registered in the second holder 60 having the smaller number of entries than the first holder 40. Therefore, detection of an inter-instruction dependency may end in a cycle in which a first instruction INSe is inputted to the instruction execution unit 80, by setting the number of entries 62 in the second holder 60 so that time taken to detect the inter-instruction dependency is 1 cycle or less. This enables the arithmetic processing device 10 to make the efficiency of processing the instruction INS better than the configuration in which the first selector 50 and the second holder 60 are omitted, even when the number of instructions INSd registered in the instruction hold unit 30 increases.

In this manner, the instruction hold unit 30 holds instructions INSd that are sequentially received from the instruction decode unit 20. With this, the instructions INSd decoded by the instruction decode unit 20 are registered in the instruction hold unit 30. Then, the instruction hold unit 30 sequentially inputs executable instructions INSe among the registered instructions INSd to the instruction execution unit 80. For example, the instruction hold unit 30 sequentially selects the executable instructions INSe and outputs the selected instructions INSe to the instruction execution unit 80.

The instruction execution unit 80 receives the executable instructions INSe from the instruction hold unit 30 and executes the received instructions INSe.

Note that a configuration of the arithmetic processing device 10 is not limited to the example illustrated in FIG. 1. For example, the second holder 60 may be located outside the instruction hold unit 30. In addition, if copying of identification information from the first holder 40 and detection of an inter-instruction dependency may be finished in a cycle in which an instruction INSe is inputted to the instruction execution unit 80, the number of entries 62 in the second holder 60 may be one.

As described above, in the embodiment illustrated in FIG. 1, even when the number of instructions INS to be held in the instruction hold unit 30 (reservation station) increases, a decrease in the efficiency of processing the instruction INS may be suppressed.

Figure 2:
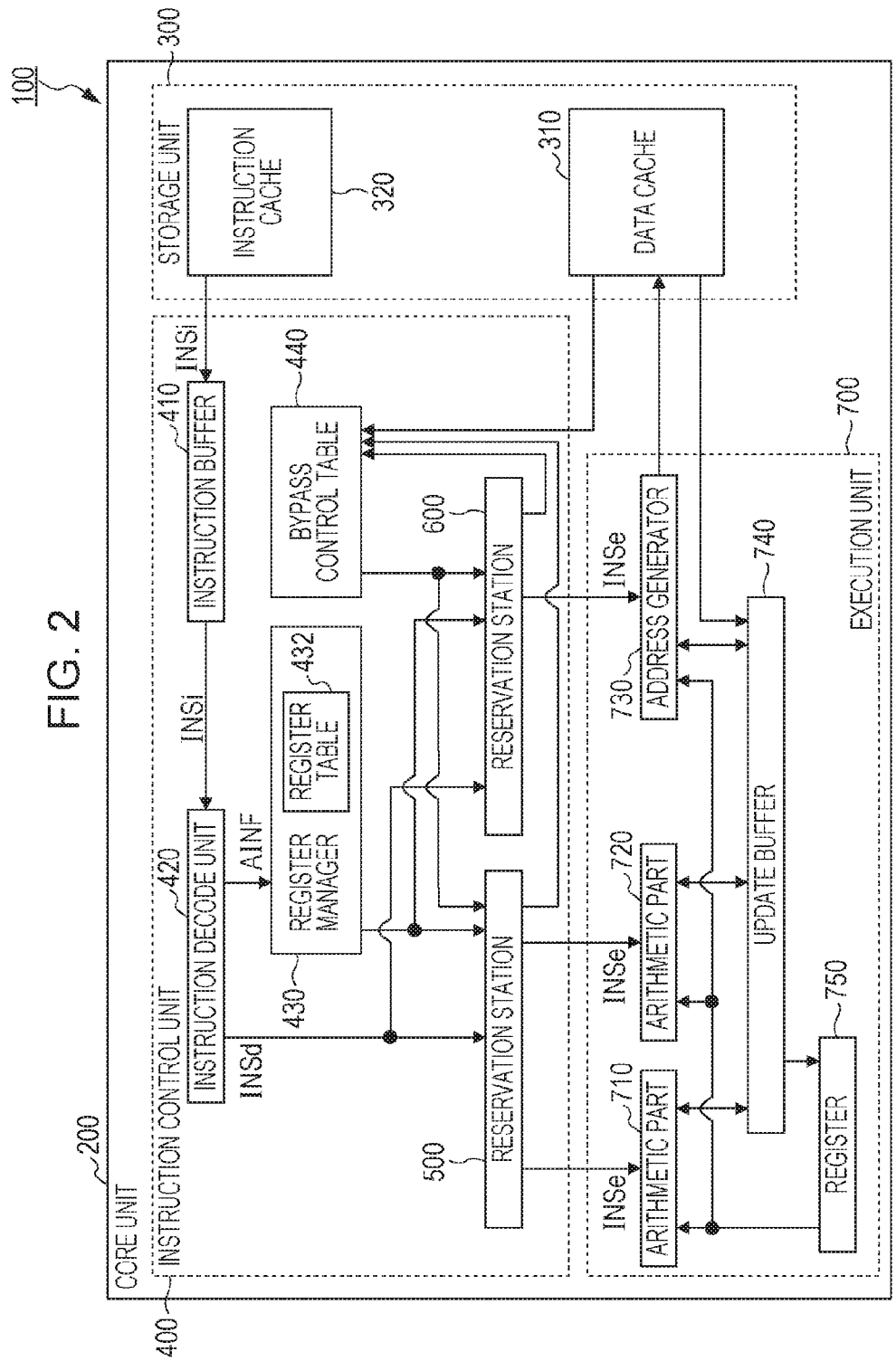
FIG. 2 is a diagram illustrating another embodiment of an arithmetic processing device and a processing method of the arithmetic processing device.
Figure 3:
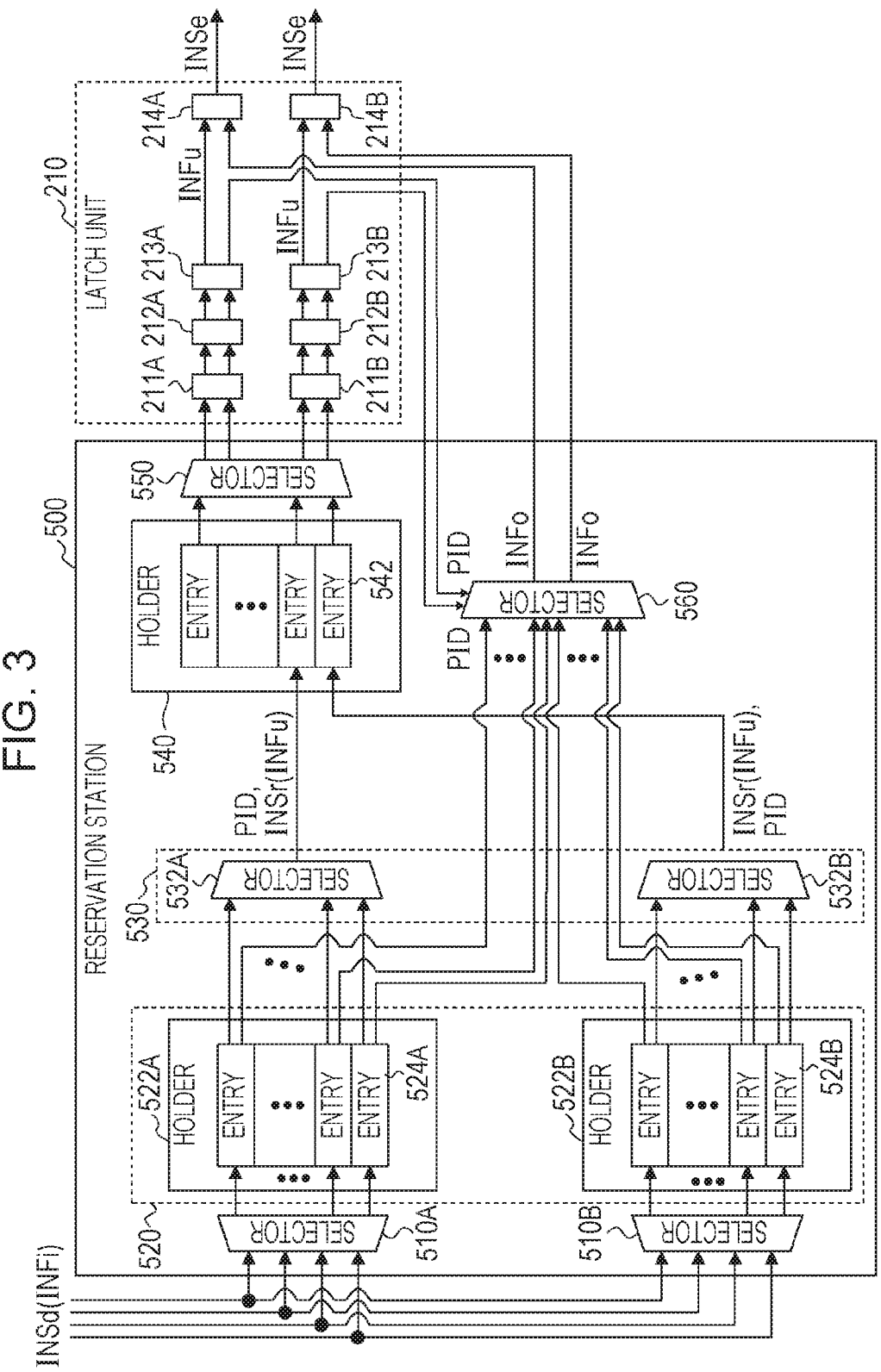
FIG. 3 is a diagram illustrating an example of a reservation station depicted in FIG. 2.

FIG. 2 illustrates another embodiment of an arithmetic processing device and a processing method of the arithmetic processing device. Elements identical or similar to the elements described in FIG. 1 are assigned with identical or similar symbols, a detailed description of which is omitted. Note that, in FIG. 2, in order to make the diagram easy to understand, depiction of a latch (latch 211A in a latch unit 210 as illustrated in FIG. 3 or the like, for example) arranged between an instruction control unit 400 and an execution unit 700 is omitted.

An arithmetic processing device 100 illustrated in FIG. 2 is a processor such as a CPU having a pipeline that divides an instruction INS into multiple stages and executes the instruction.

The arithmetic processing device 100 has a core unit 200 such as a CPU core, and the core unit 200 has a storage unit 300, an instruction control unit 400, and the execution unit 700.

The storage unit 300 has an instruction cache 320 and a data cache 310. The instruction cache 320 stores an instruction INS executed by the execution unit 700. The data cache 310 stores data handled by the execution unit 700. For example, the instruction cache 320 and the data cache 310 are cache memory.

The instruction control unit 400 has an instruction buffer 410, an instruction decode unit 420, a register manager 430, a bypass control table 440, and reservation stations 500, 600. In addition, the execution unit 700 has arithmetic parts 710, 720, an address generator 730, an update buffer 740, and a register 750.

The instruction buffer 410 has multiple areas where instructions INSi read from the instruction cache 320 are held. For example, the instruction buffer 410 holds instructions INSi sequentially received from the instruction cache 320 and sequentially transfers the held instructions INSi to the instruction decode unit 420.

The instruction decode unit 420 in-order decodes an instruction INSi received by way of the instruction buffer 410 from the instruction cache 320. Then, the instruction decode unit 420 outputs the decoded instruction INSd to the reservation station 500 or the reservation station 600 based on a decode result.

For example, when the decoded instruction INSd is a memory access instruction involving calculation of an access address, such as a load instruction or a store instruction, the instruction decode unit 420 outputs the instruction INSd to the reservation station 600. When the decoded instruction INSd is a calculation instruction (fixed-point calculation instruction, for example), the instruction decode unit 420 outputs the instruction INSd to the reservation station 500.

Here, for example, the decoded instruction INSd has information indicating an address of the update buffer 740 in which an execution result of the instruction INSd is stored, an address of the register 750 in which data handled by the instruction INSd is stored, an immediate value, an operation (OP) code identifying the instruction INSd, or the like.

For example, the instruction decode unit 420 decodes the instruction INSd and assigns the address of the update buffer 740 to the address of the register 750 which is a write destination of the execution result of the instruction INSd. Then, the instruction decode unit 420 outputs to the register manager 430 information AINF indicating the address of the update buffer 740 assigned as the write destination of the instruction INSd, or the like. In the following, an address of the update buffer 740 is also referred to as an update buffer address (UBA).

Note that the information AINF also includes an address of the register 750 in which input data of the instruction INSd is stored, an address of the register 750 to which the execution result of the instruction INSd is written, or the like, in addition to the UBA assigned as the write destination of an execution result of the instruction INSd. In the following, an address of the register 750 in which the input data of the instruction INSd is stored is also referred to as an address of a register 750, which is a reference destination, while an address of a register 750 in which an execution result of the instruction INSd is also referred to as an address of a register 750, which is a write destination.

The register manager 430 has a register table 432 indicating a correspondence between an address of the update buffer 740 and an address of the register 750. For example, the register manager 430 receives information AINF from the instruction decode unit 420 when the instruction decode unit 420 issues an instruction INSd to each reservation station 500, 600. Then, the register manager 430 registers an UBA (UBA included in the information AINF) assigned by the instruction decode unit 420 in an entry of a register table 432 corresponding to the address of the register 750 which is the write destination. In addition, if the UBA corresponding to the address of the register 750 which is the reference destination is registered in the register table 432, the register manager 430 outputs the UBA corresponding to the address of the register 750, which is the reference destination, to the reservation stations 500, 600.

The bypass control table 440 is a table to implement a bypass process in which output data of the instruction execution unit such as the arithmetic part 710 bypasses the register 750 and is provided as input data of the next instruction INSe to the instruction execution unit such as the arithmetic part 710 before being stored to the register 750. For example, the bypass control table 440 has entries corresponding to the update buffer 740. Each entry in the bypass control table 440 is set for information ("1", for example) indicating that bypassing is possible at timing when bypassing becomes possible.

For example, each entry in the bypass control table 440 is set to "1" at timing when an instruction INSe that uses the update buffer 740 may be inputted from the reservation stations 500, 600 to the execution unit 700. If the bypass process is performed, the processing performance of the arithmetic processing device 100 may be made better than a case where no bypass process is performed. In addition, the bypass control table 440 receives from the data cache 310 information indicating whether the data cache 310 makes a cache hit or a cache miss.

The reservation stations 500, 600 each are an example of an instruction hold unit that registers therein instructions INSd decoded by the instruction decode unit 420, and inputs executable instructions INSe among the registered instructions INSd to the instruction execution unit (arithmetic parts 710, 720 or the like, for example). The reservation station 500 is a reservation station for a fixed-point calculation instruction (reservation station for execution: RSE). In addition, the reservation station 600 is a reservation station for a memory access instruction (reservation station for address: RSA).

For example, the reservation station 500 holds instructions INSd supplied from the instruction decode unit 420 and sequentially inputs executable instructions INSe among the held instructions INSd to the execution unit 700 (more particularly, the arithmetic parts 710, 720). Meanwhile, the reservation station 600 holds instructions INSd supplied from the instruction decode unit 420 and sequentially inputs executable instructions INSe among the held instructions INSd to the execution unit 700 (more specifically, the address generator 730).

A determination to input an instruction INSe from the reservation stations 500, 600 to the execution unit 700 is performed by each of the reservation stations 500, 600. For example, the reservation stations 500, 600 refer to entries in the bypass control table 440 corresponding to an UBA referred to when the instruction decode unit 420 issues an instruction INSd and detect an instruction INSe that may be inputted to the execution unit 700.

With processing of the reservation stations 500, 600, executable instructions INSe among the instruction INSd decoded by the instruction decode unit 420 are first executed out-of-order irrespective of programmed order. Details of the reservation station 500 are described in and after FIG. 3.

The arithmetic parts 710, 720 and the address generator 730 are an example of an instruction execution unit that executes a decoded instruction INS. The arithmetic parts 710, 720 are an arithmetic part of a fixed point. For example, the arithmetic parts 710, 720 execute a calculation (fixed-point calculation, for example) based on the instruction INSe inputted from the reservation station 500, referring to the update buffer 740 and the register 750 or the like. In addition, the address generator 730 performs a calculation (address calculation, for example) based on the instruction INSe inputted from the reservation station 600, referring to the update buffer 740, the register 750 or the like.

For example, an instruction INSe for which an UBA is registered in the register table 432 is executed, referring to the update buffer 740, and an instruction INSe for which UBA is not registered in the register table 432 is executed, referring to the register 750.

An execution result (for example, a result of fixed-point calculation in a calculation instruction, data read from a data cache in a memory access instruction) of an instruction INSe is written to the update buffer 740. Note that since the instruction INSe is executed out-of-order, time when the calculation by the arithmetic part 710 or the like ends is not limited to time when the instruction INSe is complete. Completion of the instruction INSe is notified by the execution unit 700 through a commit stack entry (CSE), not illustrated, or the like.

The execution result of the instruction INSe is written to the register 750 from the update buffer 740 when the instruction INSe is complete. Thus, the UBA registered in the register table 432 is made invalid when the corresponding instruction INSe is complete. In addition, of UBAs held in the reservation stations 500, 600 (UBAs read from the register manager 430 to the reservation stations 500, 600), the UBA corresponding to the completed instruction INSe is discarded.

Note that a configuration of the arithmetic processing device 100 is not limited to the example illustrated in FIG. 2. For example, the execution unit 700 may have a reservation station for a floating-point arithmetic part, in addition to the arithmetic parts 710, 720. In this case, the execution unit 700 may have a reservation station for the floating-point arithmetic part.

FIG. 3 illustrates an example of the reservation station 500 depicted in FIG. 2. Note that FIG. 3 illustrates a reservation station 500 capable of a case where the instruction decode unit 420 illustrated in FIG. 2 in-order decodes up to four instructions INS in parallel. The number of instructions INS in-order decoded by the instruction decode unit 420 in parallel is not limited to four. In addition, in the reservation station 500 illustrated in FIG. 3, in order to make the diagram easy to understand, depiction of a signal received from the register manager 430, a signal to be transmitted to and received from the bypass control table 440 or the like is omitted.

Information INFi noted in brackets at the end of the instruction INSd of FIG. 3 represents information included in the instruction INSd. For example, the information INFi includes an address (UBA) of the update buffer 740 in which data handled by the instruction INSd is stored, an address of the register 750 in which data handled by the instruction INSd is stored, an immediate value, an OP code, or the like. In addition, information INFu noted in brackets at the end of the instruction INSr of FIG. 3 represents some information of the information INFi. For example, the information INFu is information (UBA, for example) used to detect an inter-instruction dependency. Information INFo is information of the information INFi, excluding the information INFu. For example, the information INFo is information that is not used in the reservation station 500 but used in the execution unit 700. Information PID is identification information that identifies entries 524 (524A, 524B).

Note that, in FIG. 3, the latch unit 210 arranged between the reservation station 500 and the arithmetic parts 710, 720 illustrated in FIG. 2 is also depicted to make flow of the information PID easy to understand. For example, the latch unit 210 has latches 211 (211A, 211B), 212 (212A, 212B), 213 (213A, 213B), and 214 (214A, 214B).

The reservation station 500 has the holders 520, 540 and the selectors 510 (510A, 510B), 530, 550, 560. The holder 520 is an example of a first holder that has multiple third holders 522 (522A, 522B) including a predetermined number of entries 524 (524A, 524B). The third holder 522 (522A, 522B) may also be referred to as the holder 522 (522A, 522B).

A selector 510A receives an instruction INSd decoded by the instruction decode unit 420 illustrated in FIG. 2. In an example illustrated in FIG. 3, the selector 510A receives up to four instructions INSd together in a same cycle. Then, the selector 510A registers an instruction INSd received from the instruction decode unit 420 in an empty entry 524A of multiple entries 524A in the holder 522A. With this, the information INFi included in the instruction INSd is held in any of the multiple entries 524A in the holder 522A.

A selector 510B is identical or similar to the selector 510A. For example, the selector 510B registers an instruction INSd received from the instruction decode unit 420 in an empty entry 524A of multiple entries 524B in the holder 522B. Note that the instruction decode unit 420 instructs on which of the holder 522A or the holder 522B the instruction INSd is to be registered.

The holder 520 has the holders 522A, 522B. The holder 522A has multiple entries 524A to hold instructions INSd decoded by the instruction decode unit 420. For example, the entry 524A selected by the selector 510A holds the instruction INSd received from the instruction decode unit 420 by way of the selector 510A. With this, the instruction INSd decoded by the instruction decode unit 420 is registered with the holder 522A.

In addition, each entry 524A holds multiple flags such as a valid flag, a ready flag, a copy flag, an older flag, or the like. The valid flag indicates that entries 524A are valid. The ready flag indicates that an instruction INSd is in an executable state. The copy flag is an example of registration information and indicates that an instruction INSd registered in own entry 524A is registered with the holder 540. The older flag indicates whether or not an order of decoding by the instruction decode unit 20 of instructions INSd registered in the own entry 524A is older than an instruction INSd registered in other entry 524A. For example, the number of bits of the older flag held by one entry 524A corresponds to the number of the other entry 524A.

The holder 522B is identical or similar to the holder 522A. For example, the entry 524B selected by the selector 510B holds the instruction INSd received from the instruction decode unit 420 by way of the selector 510B. With this, the instruction INSd decoded by the instruction decode unit 420 is registered in the holder 522B. In addition, each entry 524B holds multiple flags such as a valid flag, a ready flag, a copy flag, an older flag or the like.

In the example illustrated in FIG. 3, since the multiple entries 524A in the holder 522A and the multiple entries 524B in the holder 522B are separated, the number of bits of the older flag may be made smaller than the configuration having the entries 524A and the entries 524B together. Thus, an increase in circuit scale of a selector 530 that selects an instruction INSr which is decoded oldest by the instruction decode unit 420 based on older flags held in each entry 524A, 524B may be controlled.

The selector 530 is an example of a first selector that causes the multiple holders 522 (522A, 522B) to select in parallel instructions INSr registered in a holder 540 and each of the multiple holders 522 to register the instructions INSr in the holder 540. For example, the selector 530 has a selector 532A and a selector 532B that operate in parallel to each other.

The selector 532A selects an instruction INSr to be registered in the holder 540, from instructions INSd held in the multiple entries 524A in the holder 522A. For example, the selector 532A selects an instruction INSr decoded earliest by the instruction decode unit 420, from among the instructions INSd held in the multiple entries 524A, based on the older flag held in each entry 524A or the like. Then, the selector 532A stores in any of the multiple entries 542 in the holder 540 the identification information PID of the entry 524A in which the selected instruction INSr is registered and some information INFu included in the selected instruction INSr.

In addition, the selector 532A refers to the bypass control table 440 illustrated in FIG. 2 and determines in each cycle whether an executable instruction INSd (instruction INSd that may be inputted to the execution unit 700) is registered in the entry 524A. Then, when the instruction INSd registered in the entry 524A transitions to an executable state, the selector 532A sets a ready flag of the entry 524A in which the instruction INSd that transitions to the executable state is registered to information ("1", for example) indicating that the instruction INSd is executable.

The selector 532B is identical or similar to the selector 532A. For example, the selector 532B selects the instruction INSr decoded earliest by the instruction decode unit 420, from among the instructions INSd held in the multiple entries 524B, based on the older flag held in each entry 524B or the like. Then, the selector 532B stores in any of the multiple entries 542 in the holder 540 the identification information PID of the entry 524B in which the selected instruction INSr is registered and some information INFu included in the selected instruction INSr. Note that identification information PID outputted from the selector 530 corresponds to information that indicates the instruction INSr selected by the selector 530 (selectors 532A, 532B).

In addition, the selector 532B refers to the bypass control table 440 and determines in each cycle whether an executable instruction INSd (instruction INSd that may be inputted to the execution unit 700) is registered in the entry 524B. Then, when the instruction INSd registered in the entry 524B transitions to an executable state, the selector 532B sets a ready flag of the entry 524B in which the instruction INSd that transitions to the executable state is registered to information ("1", for example) indicating that the instruction INSd is executable.

In this manner, the selector 530 registers in the holder 540 some instructions INSr of the instructions INSd held in the multiple entries 524.

The holder 540 has multiple entries 542 the number of which is smaller than the number of multiple entries 524A and smaller than the number of multiple entries 524B. For example, each entry 542 holds information INFu, PID related to the instruction INSr selected by the selector 530. Each entry 542 also holds multiple flags such as a valid flag, a ready flag, or the like.

To each of the multiple entries 542 in the holder 540 is assigned a priority order (for example, a priority order that increases as an order of registering the instructions INSr to the entry 542 becomes older) indicating an order of registering the instructions INSr from the holders 522A, 522B. For example, an identification number identifying the entry 542 may also be used as information indicating a priority order.

Among the instructions INSr registered in the multiple entries 542 in the holder 540, executable instructions INSr, i.e., executable instructions INSe are inputted by a selector 550 to the arithmetic parts 710, 720 in descending order of priority. Note that the instructions INSr registered in the respective entries 542 are instructions INS registered in the entries 524 indicated by the identification information PID held by each entry 542.

In addition, the instructions INSr registered in the respective entries 542 moves to an entry 542 with a higher priority order than the priority order of the own entry 542, if there is empty in the entries 542 with the higher priority order than the own entry 542. In the following, movement of information held in each entry 542 to an entry 542 with a higher priority order than a priority order of an own entry 542 is also referred to as bubble up. In the example illustrated in FIG. 3, since the largest number of instructions INSr inputted from the holder 520 to the holder 540 in one cycle is two, the largest travel amount (number of entries) due to bubble up in the one cycle is two.

The selector 550 selects an executable instruction INSr, i.e., an instruction INSe from the instructions INSr registered in the holder 540 in descending order of priority. Then, the selector 550 outputs to the latch unit 210 identification information PID (identification information PID of the entry 524 in which the instruction INSd corresponding to the instruction INSe is registered) indicating the selected instruction INSe and some information INFu included in the selected instruction INSe. With this, the instruction INSe is inputted from the reservation station 500 to the execution unit 700 illustrated in FIG. 2 by way of the latch unit 210.

For example, when selecting two instructions INSe in one cycle, the selector 550 inputs the two instructions INSe to the arithmetic parts 710, 720, respectively, illustrated in FIG. 2 by way of the latch unit 210. In addition, when selecting one instruction INSe in one cycle, the selector 550 inputs the instruction INSe to any of the arithmetic parts 710, 720, by way of the latch unit 210. In this manner, when inputting an instruction INSe to the instruction execution unit such as the arithmetic part 710 or the like, the selector 550 transfers to the instruction execution unit the information INFu of the instruction INSe selected as the instruction INSe to be inputted to the instruction execution unit.

Furthermore, the selector 550 detects a dependency of instructions INSe inputted to the arithmetic parts 710, 720 and instructions INSr registered in the holder 540 based on information INFu (UBA, for example) held in each entry 542. The selector 550 also refers to the bypass control table 440 and determines in each cycle whether an executable instruction INSr (instruction INSr that may be inputted to the execution unit 700) is registered in the entry 542.

A selector 560 receives from multiple entries 524A, 524B information INFo of information INFi included in a decoded instruction INSd, excluding information INFu used to detect an inter-instruction dependency,. The selector 560 also receives from the selector 550 identification information PID indicating an instruction INSe inputted to an instruction execution unit such as the arithmetic part 710, by way of the latch unit 210 (more specifically, the latches 211, 212, 213 in the latch unit 210).

Then, the selector 560 selects information INFo of the instruction INSe inputted to the instruction execution unit such as the arithmetic part 710, of the information INFo received from the multiple entries 524A, 524B, based on the information PID received from the selector 550 by way of the latch unit 210. For example, the selector 560 selects as information INFo of the instruction INSe information INFo of the instruction INSd corresponding to the information PID received from the selector 550 by way of the latch unit 210, of the information INFo received from the multiple entries 524A, 524B. Then, the selector 560 transfers the information INFo of the instruction INSe inputted to the instruction execution unit such as the arithmetic part 710 by way of the latch unit 210 (more specifically, the latch 214 in the latch unit 210).

In this manner, the information INFu of the instruction INSe is transferred from the reservation station 500 to the instruction execution unit such as the arithmetic part 710 by way of the latches 211, 212, 213, 214. Then, other information INFo of the instruction INSe is transferred from the reservation station 500 to the instruction execution unit such as the arithmetic part 710 by way of the latch 214. Thus, the number of bits of the laches 211, 212, 213 may be made smaller than a configuration in which the information INFu, INFo is transferred from the reservation station 500 to the instruction execution unit such as the arithmetic part 710 by way of the latches 211, 212, 213, 214. Consequently, an increase in circuit scale of the latch unit 210 may be suppressed.

Note that a cycle for the information INFu, PID outputted from the reservation station 500 to pass through the latches 211, 212, 213 corresponds to a cycle in which data to be read from the register 750 is determined.

Here, if the reservation station 500 is divided into two, it is possible that the arithmetic parts 710, 720 are assigned to the divided two reservation stations (holders 522A, 522B, for example). In this case, one of the arithmetic parts 710, 720 may be occupied due to a difference in the number of cycles involved in execution of each instruction INSe inputted to the arithmetic parts 710, 720. This case may result in bias of entries such as instructions INSd waiting for execution being jammed at one of the divided two reservation stations (holders 522A, 522B, for example).

In contrast to this, since the holder 540 is shared by the holders 522A, 522B in the reservation station 500, two instructions INSe may be respectively inputted to the two arithmetic parts 710, 720 from the one holder 540. This enables the instruction INSe to be inputted to the other of the two arithmetic parts 710, 720 even when one of the two arithmetic parts 710, 720 is occupied, and thus occurrence of jamming at the reservation station 500 or the like may be reduced.

Note that the configuration of the reservation station 600 illustrated in FIG. 2 is identical or similar to the reservation station 500 except the number of instructions INSe inputted from the reservation station 600 to the address generator 730 in one cycle. In addition, a configuration of the reservation station 500 is not limited to the example illustrated in FIG. 3. For example, each entry 542 in the holder 540 may hold the older flag. In addition, each entry 542 in the holder 540 may hold information INFi (more specifically, both information INFu and information INFo) of the instruction INSr. In this case, the selector 560 may be omitted.

Figure 4:
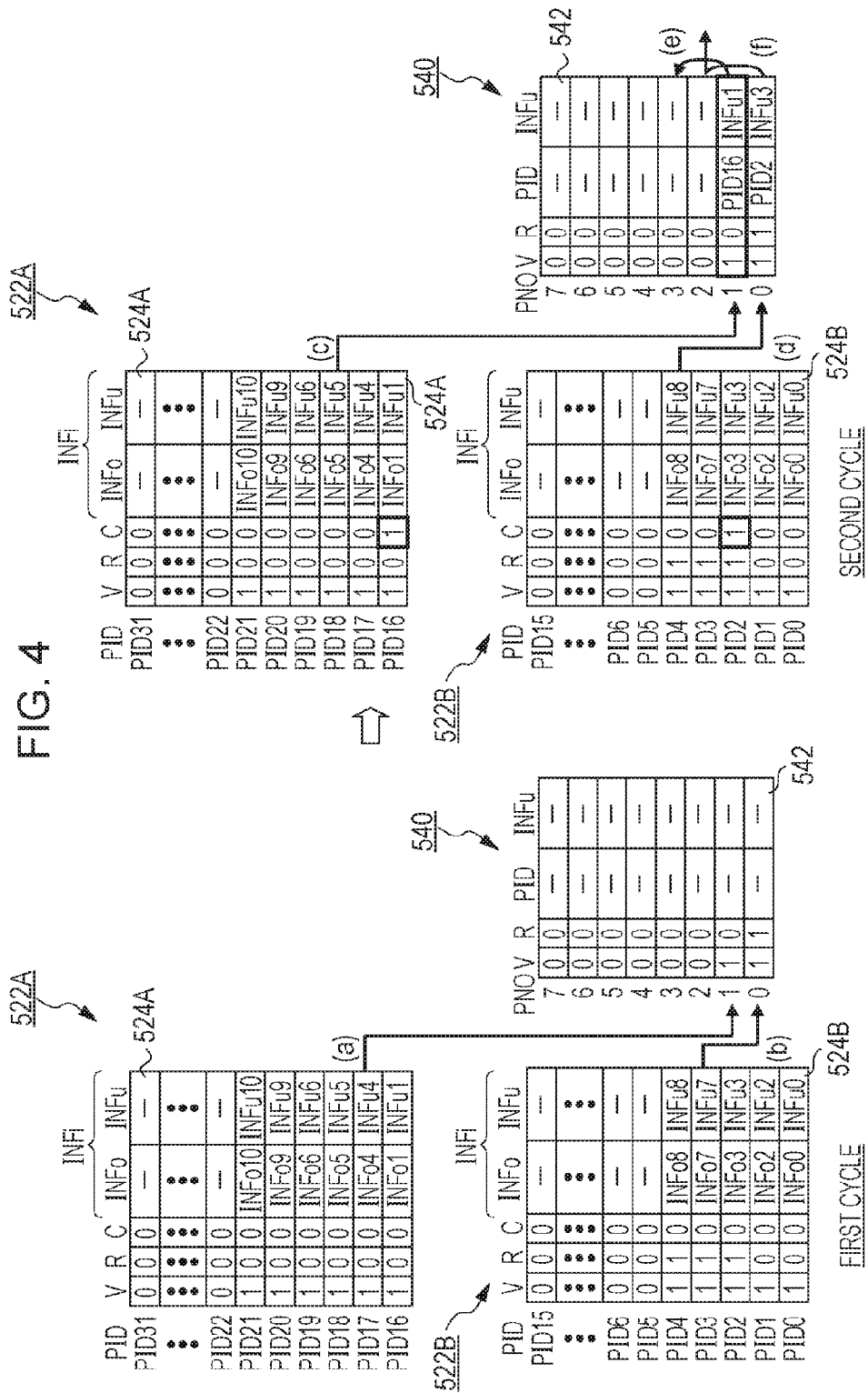
FIG. 4 is a diagram illustrating an example of each entry state depicted in FIG. 3.

FIG. 4 illustrates an example of a state of each entry 524, 542 depicted in FIG. 3. Note that FIG. 4 corresponds to an operation of the reservation station 500 when an instruction INSr is registered from the holder 520 to the holder 540 illustrated in FIG. 3. In an example illustrated in FIG. 4, the holder 522A illustrated in FIG. 3 has 16 entries 524A, the holder 522B has 16 entries 524B, the holder 540 has 8 entries 542. More specifically, the holder 520 has 32 entries 524 which is a total of the entries 524A and the entries of 524B. Note that the number of the entries 524 and the entries 542 is not limited to the example illustrated in FIG. 4.

Each entry 524 holds a valid flag V, a ready flag R, a copy flag C, an older flag (not illustrated), information INFi or the like, and each entry 542 holds a valid flag V, a ready flag R, and identification information PID and information INFu of the entry 524. An initial state of a valid flag, a ready flag R, and a copy flag C is "0", for example.

Information PID0 to PID15 represents identification information PID of each entry 524B, and information PID16 to PID31 represents identification information PID of each entry 524A. In addition, information INFo0 to INFo10 represents information INFo of each of 11 instructions INSd registered in the reservation station 500. Information INFu0 to INFu10 represents information INFu of each of the 11 instructions INSd registered in the reservation station 500.

An identification number PNO represents an identification number identifying an entry 542. In the example illustrated in FIG. 4, as the identification number of the entry 542 increases, an order of registering the instructions INSr from the entry 524 to the entry 542 becomes older and a priority order becomes higher. In the following, an entry 542 of the identification number PNO being "n (n is an integer of 0 or more and 7 or less in FIG. 4)" is also referred to as an entry 542 with the identification PNO "n". For example, an entry 542 of the identification number PNO being "0" is also referred to as an entry 542 of the identification number PNO "0".

A valid flag V is set to "1" when the entries 524, 542 are valid and "0" when the entries 524, 542 are invalid. For example, the valid flag V of the entry 524 is set to "1" indicating that a corresponding entry 524 is valid, when the instruction decode unit 420 issues an instruction INSd to the reservation station 500. Then, the valid flag V of the entry 524 is set to "0" indicating that the corresponding entry 524 is invalid, when a calculation is performed.

In the example illustrated in FIG. 4, of the 16 entries 524A, a valid entry 524A with the valid flag V being "1" is the entry 524A indicated by identification information PID16 to PID21 in both in a first cycle and a second cycle. In addition, of the 16 entries 524B, a valid entry 524B with the valid flag V being "1" is the entry 524B indicated by the identification information PID0 to PID4 both in the first cycle and the second cycle.

A ready flag R is set to "1" when instructions INSd, INSr registered in the entries 524, 542 are executable and to "0" when the instructions INSd, INSr registered in the entries 524, 542 are not executable. For example, the selectors 530, 550 refer to the bypass control table 440 to set the ready flag R.

Figure 6:
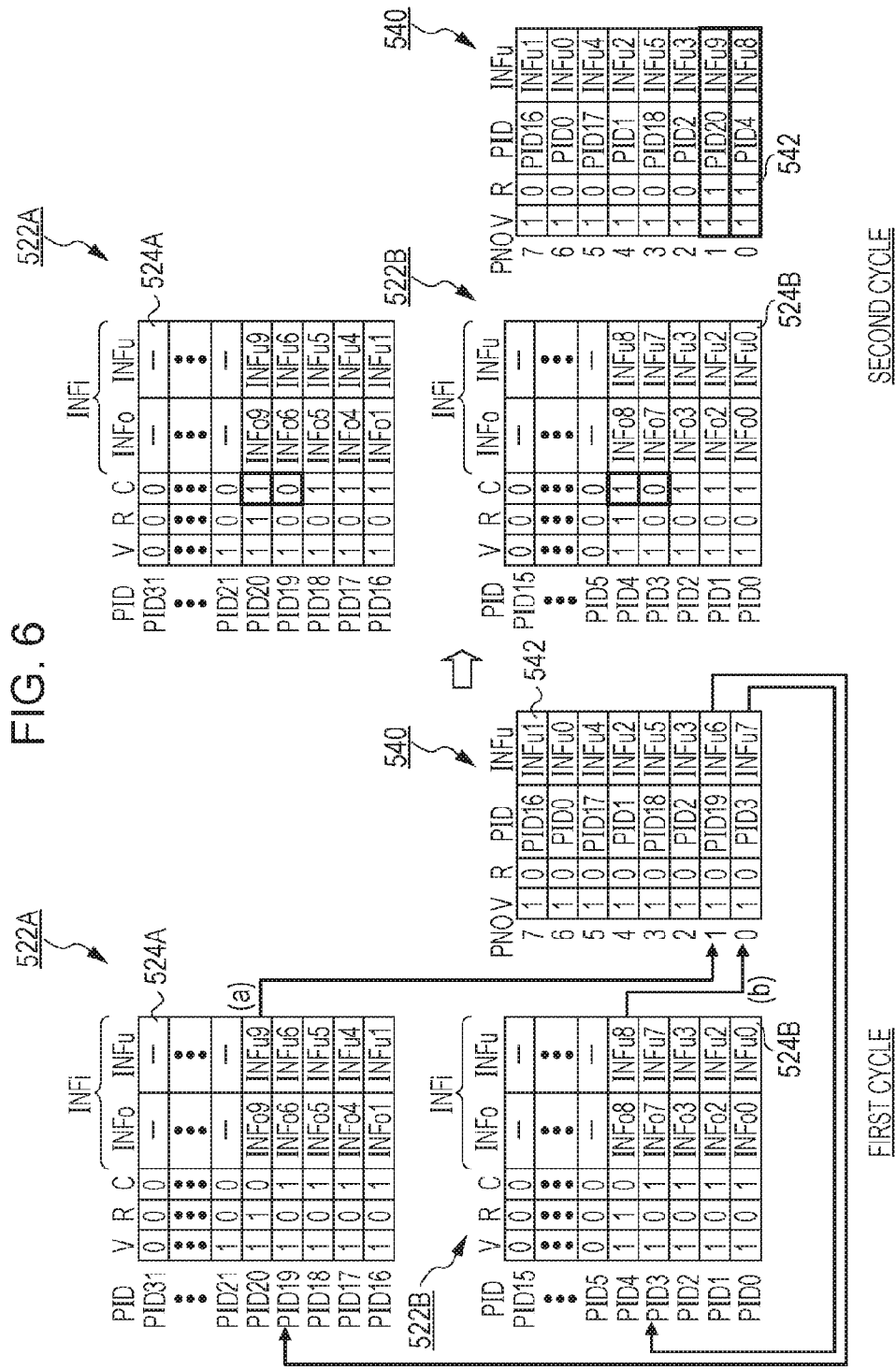
FIG. 6 is a diagram illustrating another example of each entry state depicted in FIG. 3.

A copy flag C is set to "1" when the instruction INSd registered in the entry 524 is registered in the entry 542. Note that as illustrated in FIG. 6, for example, if content of the valid entry 542 is overwritten, the copy flag C of the entry 524 that holds the instruction INSd deleted from the entry 542 due to overwriting is set to "0".

In FIG. 4, since depiction of an older flag is omitted, an operation to register an instruction INSr from the entry 524 to the entry 542 is described as the order of decoding in the instruction decode unit 420 being older and having a higher priority order as the number at the end of INFo, INFu is smaller.

In a first cycle, of valid entries 524A, the entry 524A in which the instruction INSd (instruction INSd with the highest priority order) decoded earliest by the instruction decode unit 420 is registered is the entry 524A indicated by the identification information PID16. In addition, the ready flags R of valid entries 524A (entries 524A indicated by identification information PID17-PID21) other than entry 524A indicated by the identification information PID16 are all "0". Thus, the instruction INSd registered in the entry 524A indicated by the identification information PID16 is selected as an instruction INSr to be registered in the entry 542 (FIG. 4(a)).

In addition, of valid entries 524B, the entry 524B in which the instruction INSd decoded earliest by the instruction decode unit 420 is registered is the entry 524B indicated by the identification information PID0. In addition, the ready flags R of the entries 524B indicated by identification information PID2 to PID4 of valid entries 524B (entries 524B indicated by the identification information PID1 to PID4) other than the entry 524B indicated by the identification information PID0 are "1".

Thus, the instruction INSd registered in the entry 524B indicated by the identification information PID0 is not selected as an instruction INSr registered in the entry 542. In this case, of the instructions INSd registered in the entries 524B with the ready flag R set to "1", the instruction INSd decoded earliest by the instruction decode unit 420 is selected as the instruction INSr to be registered in the entry 542.

For example, of the entries 524B indicated by the identification information PID2 to PID4, the entry 524B in which the instruction INSd decoded earliest by the instruction decode unit 420 (instruction INSd with the highest priority order) is registered is the entry 524B indicated by the identification information PID2. Thus, the instruction INSd registered in the entry 524B indicated by the identification information PID2 is selected as the instruction INSr to be registered in the entry 542 (FIG. 4(b)).

In this manner, in the first cycle, as an entry 524 of an instruction INSr registered in the holder 540, the entry 524A indicated by the identification information PID16 and the entry 524B indicated by the identification information PID2 are respectively selected from the holders 522A, 522B. With this, for example, information INFu1 held in the entry 524A indicated by the identification information PID16 and the identification information PID16 are copied to the entry 542 of the identification number PNO "1". In addition, information INFu3 held in the entry 524B indicated by the identification information PID2 and the identification information PID2 are copied to the entry 542 of the identification number PNO "0".

In the second cycle, the identification information PID16 of the entry 524A selected in the first cycle and the information INFu1 of the entry 524A indicated by the identification information PID16 are recorded in the entry 542 of the identification number PNO "1". Since the information INFu1 of the entry 524A indicated by the identification information PID16 or the like is copied to the entry 542 of the identification number PNO "1", the copy flag C of the entry 524A indicated by identification information PID16 is set to "1". In addition, the valid flag V and the ready flag R of the entry 542 of the identification number PNO "1" are respectively set to same values ("1" and "0") as the valid flag V and the ready flag R of the entry 524A indicated by the identification information PID16.

Similarly, the identification information PID2 of the entry 524B selected in the first cycle and information INFu3 of the entry 524B indicated by the identification information PID2 are recorded in the entry 542 of the identification number PNO "0". Since the information INFu3 of the entry 524B indicated by the identification information PID2 or the like is copied to the entry 542 of the identification number PNO "0", the copy flag C of the entry 524B indicated by the identification information PID2 is set to "1". In addition, the valid flag V and the ready flag R of the entry 542 of the identification number PNO "0" are respectively set to same values ("1" and "1") of the valid flag V and the ready flag R of the entry 524B indicated by the identification information PID2.

In addition, as the entry 524 of the instruction INSr registered in the holder 540, the entry 524A indicated by the identification information PID17 and the entry 524B indicated by identification information PID3 are respectively selected from the holders 522A, 522B (See FIGS. 4(c) and 4(d)). Note that the entries 524 (entry 524A indicated by the identification information PID16, the entry 524B indicated by the identification information PID2) with the copy flag C set to "1" are excluded from a target of selection. Other conditions if the entry 524 of the instruction INSr registered in the holder 540 are selected are identical or similar to the first cycle.

For example, information INFu4 held in the entry 524A indicated by the identification information PID17 and the identification information PID17 are copied to the entry 542 of the identification number PNO "1". In addition, information INFu7 held in the entry 524B indicated by the identification information PID3 and the identification information PID3 are copied to the entry 542 of the identification number PNO "0". Note that the entry 542 of the identification number PNO "0" and the entry 542 of the identification number PNO "1" become an empty entry that may hold information such as identification information PID or the like received from the entries 524, due to bubble up.

For example, information such as identification information PID held in the entry 542 of the identification number PNO "0" and the entry 542 of the identification number PNO "1" or the like move to the entry 542 with a higher priority order than the entry 542 of the identification number PNO "1" (FIGS. 4(e) and 4(f)). In addition, since the ready flag R of the entry 542 of the identification number PNO "0" is "1", the instruction INSr (instruction INSd indicated by the identification information PID2) registered in the entry 542 of the identification number PNO "0" is selected as an instruction INSe to be inputted to the execution unit 700. Thus, the valid flag V of the entry 542 that is a destination to which the information such as the identification information PID2 held in the entry 542 of the identification number PNO "0" is moved is reset to "0".

Here, the identification information PID (PID2, PID16) held in each entry 542 is used when information INFo of the instruction INSe to be inputted to the execution unit 700 is selected from the holders 522A, 522B, as illustrated in FIG. 3. In addition, the identification information PID held in each entry 542 is also used to reset the valid flag V of the entry 524 when a calculation by the arithmetic part 710 or the like is complete.

Figure 5:
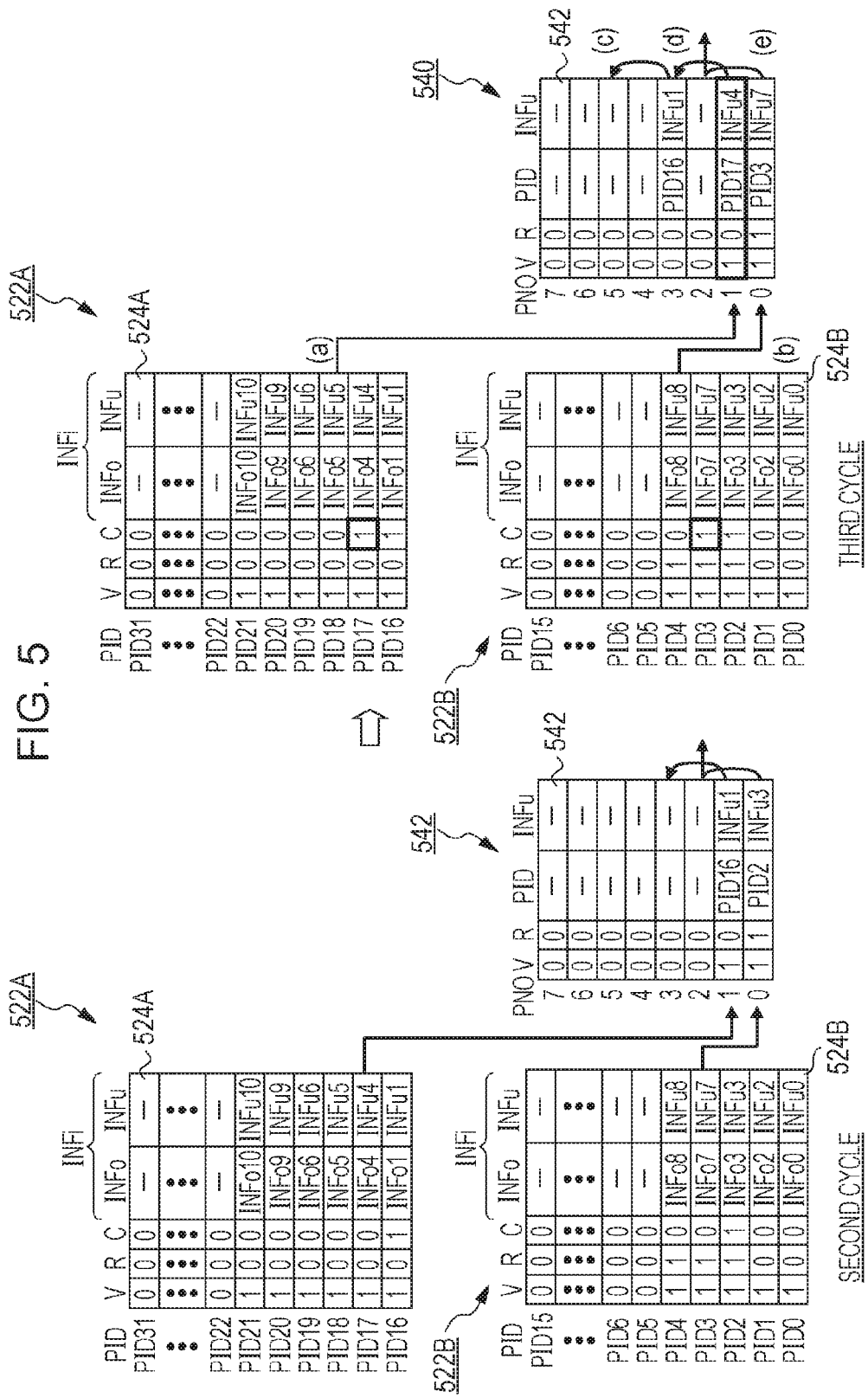
FIG. 5 is a diagram illustrating another example of each entry state depicted in FIG. 3.

FIG. 5 illustrates another example of a state of each entry 524, 542 depicted in FIG. 3. Note that FIG. 5 illustrates continuation of the second cycle illustrated in FIG. 4. The state of each entry 524, 542 in the second cycle illustrated in FIG. 5 is the state of each entry 524, 542 in the second cycle illustrated in FIG. 4. Therefore, in FIG. 5, the state of each entry 524, 542 in a third cycle is described.

In the third cycle, the information PID16, INFu1 move from the entry 542 of the identification number PNO "1" due to bubble up in the second cycle and is held in the entry 542 of the identification number PNO "3". Since the information PID2, INFu3 are inputted to the execution unit 700, the information PID2, INFu3 are deleted from the holder 540.

In addition, the identification information PID17 of the entry 524A selected in the second cycle and the information INFu4 of the entry 524A indicated by the identification information PID17 are recorded in the entry 542 of the identification number PNO "1". Similarly, the identification information PID3 of the entry 524B selected in the second cycle and the information INFu7 of the entry 524B indicated by the identification information PID3 are recorded in the entry 542 of the identification number PNO "0".

Then, with a selection method similar to the second cycle, the entry 524 of the instruction INSr registered in the holder 540 is selected. For example, as the entry 524 of the instruction INSr registered in the holder 540, the entry 524A indicated by the identification information PID18 and the entry 524B indicated by the identification information PID4 are respectively selected from the holders 522A, 522B (FIGS. 4(a) and 4(b)).

With this, information INFu5 held in the entry 524A indicated by the identification information PID18 and the identification information PID18, for example, are copied to the entry 542 of the identification number PNO "1". In addition, information INFu8 held in the entry 524B indicated by the identification information PID4 and the identification information PID4 are copied to the entry 542 of the identification number PNO "0".

Note that the entry 542 of the identification number PNO "0" and the entry 542 of the identification number PNO "1" become an empty entry due to bubble up in the holder 540.

For example, the information PID16, INFu1 held in the entry 542 of the identification number PNO "3" move to the entry 542 of the identification number PNO "5" (FIG. 4(c)). The information PID17, INFu4 held in the entry 542 of the identification number PNO "1" move to the entry 542 of the identification number PNO "3" (FIG. 4(d)). The instruction INSr (instruction INSd indicated by the identification information PID3) registered in the entry 542 of the identification number PNO "0" is selected as an instruction INSe to be inputted to the execution unit 700 (FIG. 4(e)). Thus, the valid flag V of the entry 542 that is a destination to which the information such as the identification information PID2 held in the entry 542 of the identification number PNO "0" or the like moves is reset to "0".

FIG. 6 illustrates another example of a state of each entry 524, 542 depicted in FIG. 3. Note that FIG. 6 corresponds to an operation of the reservation station 500 when all entries 542 in the holder 540 are filled.

In a first cycle, all the entries 542 in the holder 540 are filled with entries 542 with the ready flag R being "0". On the other hand, in the holders 522A, 522B are present entries 542 with the valid flag V and the copy flag C being respectively "1" and "0", and the ready flag R being "1".

For example, in the holder 522A, the valid flag V, the ready flag R, and the copy flag C of the entry 524A indicated by identification information PID20 are respectively, "1", "1", and "0". In addition, in the holder 522B, the valid flag V, the ready flag R, and the copy flag C of the entry 524B indicated by the identification information PID4 are respectively, "1", "1", and "0".

In this case, as entries 524 that overwrite the entries 542 in the holder 540, the entry 524A indicated by the identification information PID20 and the entry 524B indicated by the identification information PID4 are respectively selected from the holders 522A, 522B (FIGS. 6(a) and 6(b)). With this, for example, information INFu9 held in the entry 524A indicated by the identification information PID20 and the identification information PID20 overwrite the entry 542 of the identification number PNO "1". In addition, information INFu8 held in the entry 524B indicated by the identification information PID4 and the identification information PID4 overwrite the entry 542 of the identification number PNO "0".

Note that the copy flag C of the entry 524 indicated by the identification information PID held in the entry 542 overwritten by information INFu or the like is set to "0". For example, the copy flags C of the entries 524A, 524B indicated by identification information PID19, PID3 held in the entry 542 of the identification number PNO "1" and the entry 542 of the identification number PNO "0" are set to "0" in the following cycle (second cycle).

In the second cycle, the identification information PID20 of the entry 524A selected in the first cycle and the information INFu9 of the entry 524A indicated by the identification information PID20 are recorded in the entry 542 of the identification number PNO "1". In addition, the valid flag V and the ready flag R of the entry 542 of the identification number PNO "1" are respectively set to same values ("1" and "1") of the valid flag V and the ready flag R of the entry 524A indicated by the identification information PID20.

Similarly, the identification information PID4 of the entry 524B selected in the first cycle and the information INFu8 of the entry 524B indicated by the identification information PID4 are recorded in the entry 542 of the identification number PNO "0". In addition, the valid flag V and the ready flag R of the entry 542 of the identification number PNO "0" are respectively set to same values ("1" and "1") of the valid flag V and the ready flag R of the entry 524B indicated by the identification information PID4.

In the holder 522A, since the information INFu9 of the entry 524A indicated by the identification information PID20 or the like overwrites the entry 542 of the identification number PNO "1", the copy flag C of the entry 524A indicated by the identification information PID20 is set to "1". In addition, the copy flag C of the entry 524A indicated by the identification information PID19 that is deleted from the entry 542 of the identification number PNO "1" due to overwriting of the information INFu9 or the like is set to "0".

In the holder 522B, since the information INFu8 of the entry 524B indicated by the identification information PID4 or the like overwrites the entry 542 of the identification number PNO "0", the copy flag C of the entry 524B indicated by the identification information PID4 is set to "1". In addition, the copy flag C of the entry 524A indicated by the identification information PID13 that is deleted from the entry 542 of the identification number PNO "0" due to overwriting of the information INFu8 or the like is set to "0".

With this, even when all the entries 542 in the holder 540 are filled with instructions INSr that are not executable, the reservation station 500 may suppress a delay in input of instructions INSe to the execution unit 700.

For example, if all the entries 542 in the holder 540 are filled with the instructions INSr that are not executable, an operation that does not overwrite the entry 542 may stop copying of the instruction INSd (such as information INFu) from the holder 520 to the holder 540. In this case, even when the instruction INSd registered in the holder 520 transitions to an executable state earlier than the instruction INSr registered in the holder 540, the executable instruction INSd is not copied to the holder 540 till there is any empty entry in the holder 540.

In contrast to this, when the instruction INSd registered in the holder 520 transitions to an executable state earlier than the instruction INSr registered in the holder 540, the selector 530 overwrites the executable instruction INSd from the holder 520 to the entry 542 in the holder 540. With this, instructions INSe may be efficiently inputted to the execution unit 700, and performance degradation of the arithmetic processing device may be suppressed.

Figure 7:
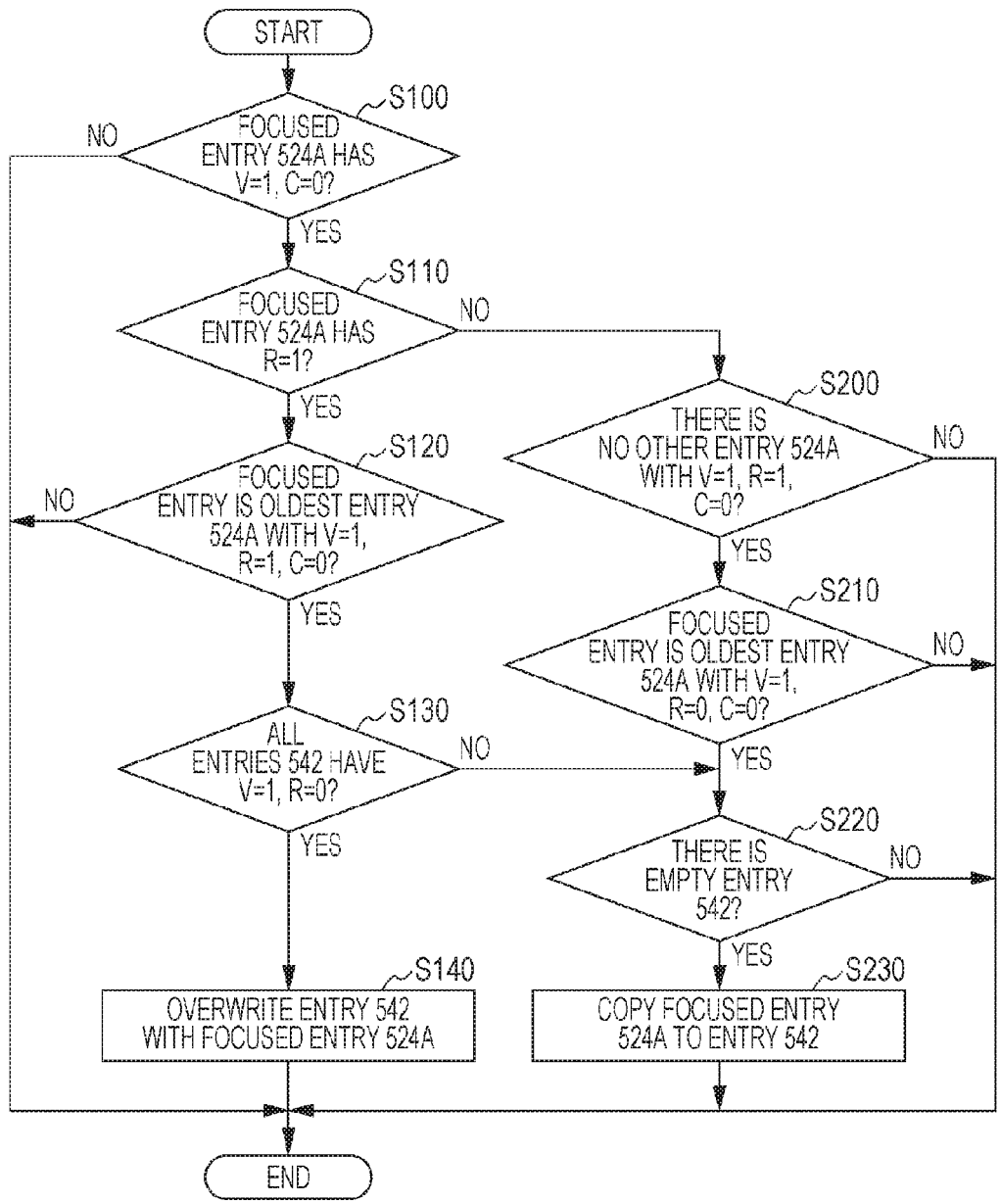
FIG. 7 is a diagram illustrating an example of an operation of a selector depicted in FIG. 3.

FIG. 7 illustrates an example of an operation of the selector 532A depicted in FIG. 3. More specifically, FIG. 7 illustrates a processing method of the arithmetic processing device 100 (more specifically, a control method of the arithmetic processing device 100). Note that FIG. 7 illustrates an operation of the selector 532A on one entry 524A (hereinafter referred to as a focused entry 524A) of the multiple entries 524A. The selector 532A performs the operation illustrated in FIG. 7 on each of the multiple entries 524A in the holder 522A in parallel. For example, the selector 532A may have multiple selection circuits that each correspond to the multiple entries 524A in the holder 522A and performs the operation illustrated in FIG. 7 in parallel.

In step S100, the selector 532A determines whether or not the valid flag V and the copy flag C of the focused entry 524A are respectively "1" and "0". More specifically, the selector 532A determines whether or not the focused entry 524A (more particularly, information INFu held in the focused entry 524A, identification information PID of the focused entry 524A or the like) has already been copied to the entry 542 in the holder 540.

When the valid flag V and the copy flag C of the focused entry 524A are respectively "1" and "0", the operation of the selector 532A shifts to step S110. On the other hand, when the valid flag V and the copy flag C of the focused entry 524A are not respectively "1" and "0", the selector 532A finishes processing related to the focused entry 524A without copying the focused entry 524A to the entry 542.

For example, when the valid flag V and the copy flag C of the focused entry 524A are both "1", the selector 532A determines that the focused entry 524A has already been copied to the entry 542 in the holder 540. Thus, the selector 532A finishes the processing related to the focused entry 524A without copying the focused entry 524A to the entry 542. In addition, when the valid flag of the focused entry 524A is "0", the focused entry 524A is an empty entry. Thus, the selector 532A finishes the processing related to the focused entry 524A without copying the focused entry 524A to the entry 542.

In step S110, the selector 532A determines whether or not the ready flag R of the focused entry 524A is "1". More specifically, the selector 532A determines whether or not the instruction INSd held in the focused entry 524A is executable.

Here, the entry 524A whose ready flag R and copy flag C are respectively "0" and "1" is the entry 524A that holds the executable instruction INSd (instruction INSd that may be inputted to the execution unit 700) but is not copied to the entry 542. Therefore, the instruction INSd held in the entry 524A whose ready flag R is "1" is an instruction INSd that may be immediately inputted to the execution unit 700 if the instruction INSd is registered in the entry 542. Thus, the entry 524A whose ready flag R is "1" has a higher priority order when selecting the entry 524A to be copied to the entry 542 in the holder 540 than the entry 524A whose ready flag R is "0".

When the ready flag R of the focused entry 524A is "1", the operation of the selector 532A shifts to step S120. On the other hand, when the ready flag R of the focused entry 524A is not "1" (more specifically, when the ready flag R of the focused entry 524A is "0"), the operation of the selector 532A shifts to the step S200.

In step S120, the selector 532A determines whether or not the focused entry 524A is the oldest entry 524A among the entries 524A whose valid flag V, ready flag R, and copy flag C are respectively "1", "1", and "1". Note that the oldest entry 524A is the entry 524A that holds the instruction INSd decoded earliest by the instruction decode unit 420, of the instructions INSd held in the entries 524A that are a target of determination.

The determination in step S120 is made by using, for example, all bits of the older flag of the focused entry 524A, and the ready flag R and the copy flag C of the entries 524A corresponding to each bit of the older flag of the focused entry 524A. For example, the selector 532A determines whether or not the entry 524A whose ready flag R and copy flag C are respectively "1" and "0" and which is older than the focused entry 524A is present in the holder 522A.

Note that the entry 524A which is older than the focused entry 524A is the entry 524A that holds the instruction INSd whose order of decoding in the instruction decode unit 420 is older than the instruction INSd held in the focused entry 524A. It is determined by referring to the older flag of the focused entry 524A whether or not the entry 524A older than the focused entry 524A is present in the holder 522A.

If the focused entry 524A is the oldest entry 524A of the entries 524A whose valid flag V, ready flag R, and copy flag C are respectively "1", "1", and "0", the operation of the selector 532A shifts to step S130. Note that if the entry 524A whose valid flag V, ready flag R, and copy flag C are respectively "1", "1", and "0" is only the focused entry 524A, it is determined that the focused entry 524A is the oldest entry 524A.

On the other hand, if the focused entry 524A is not the oldest entry 524A of the entries 524A whose valid flag V, ready flag R, and copy flag C are respectively "1", "1", and "0", the operation of the selector 532A on the focused entry 524A ends. In this case, since any of the entries 524A other than the focused entry 524A is copied to the entry 542, the selector 532A finishes the processing related to the focused entry 524A without copying the focused entry 524A to the entry 542.

In step S130, the selector 532A determines whether or not the valid flags V and the ready flags R of all the entries 542 in the holder 540 are each "1" and "0". More specifically, the selector 532A determines whether there is no empty entry in the holder 540 and the ready flags R of all the entries 542 are "0". With this, it is determined whether or not the focused entry 524A overwrites the entry 542.

When the valid flags V and the ready flags R of all the entries 542 in the holder 540 are respectively "1" and "0", the operation of the selector 532A shifts to step S140. On the other hand, when the valid flags V and the ready flags R of any of multiple entries 542 in the holder 540 is not respectively "1" and "0", the operation of the selector 532A shifts to step S220. For example, if the valid flags V of any of the multiple entries 542 in the holder 540 is "0", in step S220, it is determined that there is empty in the entries 542, and the focused entry 524A is copied to the entry 542 in step S230.

In step S140, the selector 532A overwrites the entry 542 with the focused entry 524A. For example, the selector 532A overwrites the entry 542 with some information INFu included in the instruction INSd registered in the focused entry 524A and identification information PID indicating the focused entry 524A. In this case, the selector 532A sets to "0" the copy flag C of the entry 524A indicated by the identification information PID that is deleted from the entry 542 due to overwriting.

In this manner, when there is no empty in multiple entries 542 and any of the instructions INSr registered in the holder 540 is not executable, the selector 532A overwrites the entry 542 with information such as identification information PID indicating the executable instruction INSd held in the entry 524A or the like. For example, the selector 532A performs the processing in step S140 if any of the instructions INSd held in the multiple entries 524A transitions to an executable state before any of the instructions INSr registered in the holder 540 transitions to an executable state. Then, the selector 532A changes the copy flag C of the entry 524A that holds the instruction INS (INSd) deleted from the holder 540 due to overwriting to an initial state ("0") indicating that the instruction INSd is not registered in the holder 540.

In step S200, the selector 532A determines whether other entries 524A whose valid flag V, ready flag R, and copy flag C are respectively "1", "1", and "0" are present. More specifically, the selector 532A determines whether other entry 524A having a higher priority order than the focused entry 524A is present.

If other entries 524A whose valid flag V, ready flag R, and copy flag C are respectively "1", "1", and "0" are present, the operation of the selector 532A related to processing of the focused entry 524A ends. In this case, since any of other entries 524A is copied to the entry 542, the selector 532A finishes processing related to the focused entry 524A without copying the focused entry 524A to the entry 542.

On the other hand, if other entries 524A whose valid flag V, ready flag R, and copy flag C are respectively "1", "1", and "0" are not present, the operation of the selector 532A shifts to step S210.

In step S210, the selector 532A determines whether or not the focused entry 524A is the oldest entry 524A of the entries 524A whose valid flag V, ready flag R, and copy flag C are respectively "1", "0", and "0". The determination in step S210 is made by using, for example, all bits of the older fag of the focused entry 524A, and the ready flag R and the copy flag C of the entry 524A corresponding to each bit of the older flag of the focused entry 524A. For example, the selector 532A determines whether or not the entry 524A whose ready flag R and copy flag C are both "0" and which is older than the focused entry 524A is present in the holder 522A.

If the focused entry 524A is the oldest entry 524A of the entries 524A whose valid flag V, ready flag R, and copy flag C are respectively "1", "0", and "0", the operation of the selector 532A shifts to step S220. Note that if the entry 524A whose valid flag V, ready flag R, and copy flag C are respectively "1", "0", and "0" is only the focused entry 524A, it is determined that the focused entry 524A is the oldest entry 524A.

On the other hand, if the focused entry 524A is not the oldest entry 524A of the entries 524A whose valid flag V, ready flag R, and copy flag C are respectively "1", "0", and "0", the operation of the selector 532A related to the focused entry 524A ends. In this case, since any of the other entries 524A is copied to the entry 542, the selector 532A finishes the processing related to the focused entry 524A without copying the focused entry 524A to the entry 542.

In step S220, the selector 532A determines whether or not there is empty in the entries 542 in the holder 540. For example, the selector 532A determines whether any of the valid flags V of the multiple entries 542 in the holder 540 is "0". If there is empty in the entries 542 in the holder 540, the operation of the selector 532A shifts to step S230. On the other hand, If there is no empty in the entries 542 in the holder 540, the selector 532A finishes the processing related to the focused entry 524A without copying the focused entry 524A to the entry 542.

In step S230, the selector 532A copies the focused entry 524A to the entry 542. For example, the selector 532A stores some information INFu included in the instruction INSd registered in the focused entry 524A and identification information PID indicating the focused entry 524A in any (empty entry) of the entries 542.

In this manner, even when any of instructions INS not registered in the holder 540 is not executable of the instructions INS held in the multiple entries 524, the selector 532A selects an instruction INS to be registered in the holder 540. For example, the selector 532A selects as the instruction INS to be registered in the holder 540 the instruction INS decoded earliest by the instruction decode unit 420, of the instructions INS not registered in the holder 540 of the instructions INS held in the multiple entries 524.

Note that the operation of the selector 532A is not limited to the example illustrated in FIG. 7. In addition, the operation of the selector 532B is identical or similar to the operation of the selector 532A (more specifically, the operation illustrated in FIG. 7).

Figure 8:
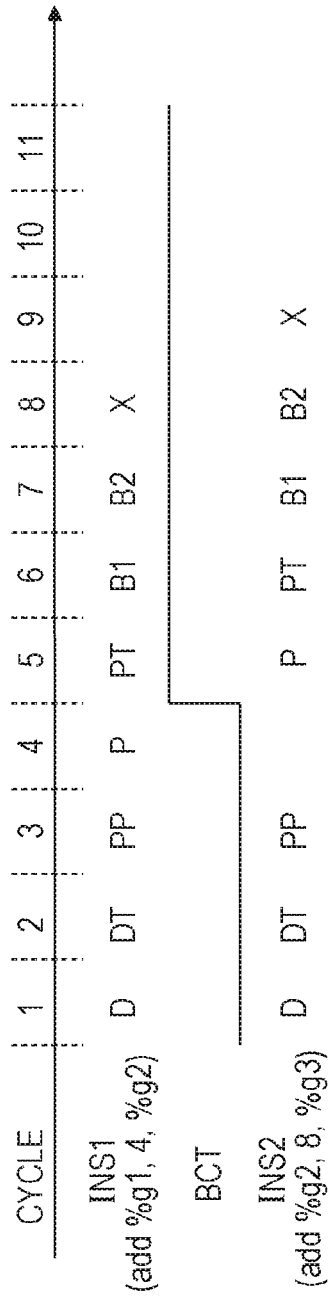
FIG. 8 is a diagram illustrating an example of a pipeline process of an arithmetic processing device depicted in FIG. 2.

FIG. 8 illustrates an example of a pipeline process of the arithmetic processing device 100 depicted in FIG. 2. Note that FIG. 8 illustrates an example of a pipeline process when an instruction INS2 is registered in the holder 540 before entering an executable state. There is a dependency of the register 750 between two instructions INS (INS1, INS2) illustrated in FIG. 8. For example, the instructions INS1, INS2 are an add instruction illustrated below in (1) and (2), respectively.

add %g1, 4, %g2 ... (1)
add %g2, 8, %g3 ... (2)

Registers g1, g2, g3 are, for example, a fixed-point calculation register provided in the register 750 illustrated in FIG. 3. The instruction INS1 is an instruction to add data stored in the register g1 to an immediate value "4" and store an addition result in the register g2. The instruction INS2 is an add instruction to add data stored in the register g2 and an immediate value "8" and store an addition result in the register g3. Since the instruction INS2 refers to the register g2 to which an execution result of the instruction INS1 is written, there is a dependency of the instruction INS1 and the register 750. In addition, the instructions INS1, INS2 are a continuous sequence of instructions.

Symbols D, DT, PP, P, PT, B1, B2, and X depicted in FIG. 8 represent a cycle in each pipeline stage. For example, in decode (D) cycle, an instruction INS is decoded and the decoded instruction INS is transferred to the reservation station 500. In a decode transfer (DT) cycle, the instruction INS decoded in the D cycle is stored in the reservation station 500. In a pre priority (PP) cycle, an instruction INS (more specifically, information INFu of the instruction INS, PID indicating the instruction INS, or the like) stored in the holder 520 is copied to the holder 540.

In a priority (P) cycle, an instruction INS that is inputted from the holder 540 to the execution unit 700 is determined. In a priority transfer (PT) cycle, the instruction INS determined in the P cycle is inputted to the execution unit 700. In buffer (B1 and B2) cycles, data desirable for calculation is determined. In an execute (X) cycle, the execution unit 700 executes the instruction INS. In a cycle following the X cycle, writing to a renaming register is performed.

In addition, a symbol BCT illustrated in FIG. 8 represents an entry corresponding to an address of the update buffer 740 (UBA corresponding to the register g2) assigned to the instruction INS1. For example, the entry BCT set to "1" indicates that bypassing is possible for the instruction INS2.

In a first cycle, processing of the D cycle of the instruction INS1 and processing of the D cycle of the instruction INS2 are performed. For example, the instruction decode unit 420 illustrated in FIG. 3 decodes the instructions INS1, INS2 and transfers the decoded instructions INS1, INS2 to the reservation station 500. Note that while the instructions INS1, INS2 are continuous sequences of instructions, there may be a time difference in performing the D cycles depending on a relation of the number of instructions INS that may be decoded simultaneously. In addition, the D cycles of the instructions INS1, INS2 may also differ from each other if the instructions INS1, INS2 are not continuous.

In a second cycle, processing of the DT cycle of the instruction INS1 and processing of the DT cycle of the instruction INS2 are performed. For example, the selector 510A (or the selector 510B) illustrated in FIG. 3 stores the instructions INS1, INS2, which are decoded in the D cycle, in the entry 524A in the holder 522A (or in the entry 524B in the holder 522B). A pipeline process of the arithmetic processing device 100 is described hereinafter, based on the assumption that the instructions INS1, INS2 are stored in the entry 524A in the holder 522A.

In a third cycle, processing of the PP cycle of the instruction INS1 and processing of the PP cycle of the instruction INS2 are performed. For example, the selector 532A illustrated in FIG. 3 copies the instructions INS1, INS2 (more specifically, information PID or the like indicating the instructions INS1, INS2, respectively) from the holder 522A to the holder 540. Note that depending on empty status of the entries 542 in the holder 540 or the like, there may be an interval from the DT cycle to the PP cycle.

In addition, in the example illustrated in FIG. 8, the instruction INS1 has no dependency on a preceding instruction INS. More specifically, when the instruction INS1 is stored in the holder 522A, the instruction INS1 is already in an executable state. Therefore, the ready flags R of the entries 524A, 542 in which the instruction INS1 is registered are "1". On the other hand, the instruction INS2 has a dependency on the instruction INS1 and the register 750, and the instruction INS1 is not inputted to the execution unit 700, the ready flags R of the entries 524A, 542 in which the instruction INS1 is registered are "0".

In a fourth cycle, since the ready flag R of the entry 542 of the instruction INS1 is "1", processing of the P cycle of the instruction INS1 is performed. For example, the selector 550 selects the instruction INS1 as an instruction INS to be inputted to the execution unit 700. On the other hand, the instruction INS2 stays in the holder 540 because the ready flag R of the entry 542 is "0".

In addition, the selector 550 checks for a dependency of the instruction INS1 that is determined as the instruction INS to be inputted to the execution unit 700 and the instruction INS registered in the holder 540. Since the number of the entries 542 in the holder 540 is smaller than the number of the entries 524A in the holder 522A, the selector 550 may detect during the P cycle (fourth cycle) of the instruction INS1 that the dependency of the instruction INS1 and the instruction INS2 is cleared.

In addition, the selector 550 sets the entry BCT to "1". Note that in the example illustrated in FIG. 8, since it is detected in the fourth cycle that the dependency of the instruction INS1 and the instruction INS2 is cleared, the bypassing for the instruction INS2 is performed without using the entry BCT.

In a fifth cycle, processing of the PT cycle of the instruction INS1 is performed. For example, the selector 550 outputs to any of the latch units 211A, 211B identification information PID indicating the instruction INS1 selected in the P cycle and some information INFu included in the instruction INS1. In addition, for the instruction INS2, since the dependency with the instruction INS1 is cleared, processing of the P cycle of the instruction INS2 is performed.

In and after a sixth cycle, processing of the B1 cycle, the B2 cycle, and the X cycle of the instruction INS1 is sequentially performed, and processing of the PT cycle, the B1 cycle, the B2 cycle, and the X cycle of the instruction INS2 is sequentially performed.

In this manner, instead of checking for a dependency of the instruction INS1 inputted to the execution unit 700 and all instructions INS registered in the holder 522A, the selector 550 checks for a dependency of the instruction INS1 and all the instructions INS registered in the holder 540. The largest number of the instructions INS registered in the holder 540 (number of the entries 542) is smaller than the largest number of the instructions INS registered in the holder 522A (number of the entries 524A).

Thus, frequencies of the arithmetic processing device 100 may be improved, while suppressing an increase in circuit scale of the selector 550 that determines whether the instruction INS for which bypassing is possible (instruction INS a dependency of which is cleared) is registered in the holder 540. For example, the selector 550 may make time taken to detect a dependency of the instruction INS1 and the instruction INS registered in the holder 540 shorter than a case where a dependency of the instruction INS1 and the instruction INS registered in the holder 522A is checked. Consequently, the P cycle of the instruction INS1 and the P cycle of the instruction INS2 following the instruction INS1 may be continuously processed. In addition, since the increase in circuit scale of the selector 550 or the like may be suppressed, an increase in consumed power may also be suppressed.

Figure 9:
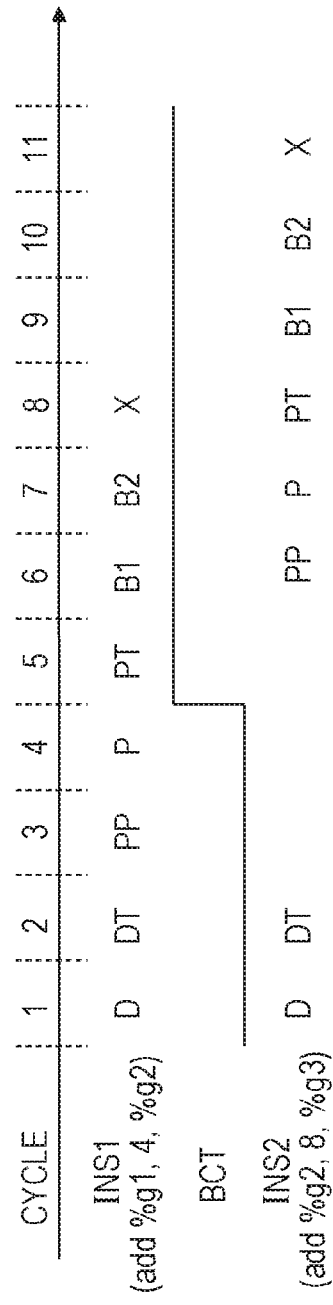
FIG. 9 is a diagram illustrating another example of a pipeline process of the arithmetic processing device depicted in FIG. 2.

FIG. 9 illustrates another example of a pipeline process of the arithmetic processing device 100 depicted in FIG. 2. Note that FIG. 9 illustrates one example of a pipeline process when an instruction INS2 is registered in the holder 540 after entering an executable state. Instructions INS1, INS2 are identical to the instructions INS1, INS2 illustrated in FIG. 8. For example, the instruction INS1 adds data stored in the register g1 and an immediate value "4" and store an addition result in the register g2. The instruction INS2 is an add instruction to add data stored in the register g2 and an immediate value "8" and store an addition result in the register g3. In addition, the instructions INS1, INS2 are a continuous sequence of instructions, and the instruction INS1 and the instruction INS2 are in a dependency on the register 750.

A pipeline process of the instructions INS1, INS2 illustrated in FIG. 9 is identical or similar to FIG. 8 except timing when a cycle after the PP cycle of the instruction INS2 is performed. For example, a pipeline process of the instruction INS1 is identical or similar to the pipeline process of the instruction INS1 illustrated in FIG. 8.

In a first cycle, similar to the first cycle illustrated in FIG. 8, processing of the D cycle of the instruction INS1 and processing of the D cycle of the instruction INS2 are performed.

In a second cycle, similar to the second cycle illustrated in FIG. 8, processing of the DT cycle of the instruction INS1 and processing of the DT cycle of the instruction INS2 are performed.

In a third cycle, while processing of the PP cycle of the instruction INS1 is executed, processing of the PP cycle of the instruction INS2 is not performed. For example, in a case such as when no empty entry is present in the holder 540, when an instruction INS with a higher priority order than the instruction INS2 is registered in the holder 522A, or the like, processing of registering the instruction INS2 in the holder 540 (processing of the PP cycle of the instruction INS2) is not performed.

In a fourth cycle, processing of the P cycle of the instruction INS1 is performed and processing of changing the entry BCT from "0" to "1" is performed. For example, the selector 550 sets the entry BCT to "1".

In addition, in the fourth cycle, a dependency of the instruction INS1 determined as an instruction INS to be inputted to the execution unit 700 and the instruction INS registered in the holder 540 is checked. Note that checking of a dependency in the fourth cycle is performed on instructions INS registered in the holder 540. Since the instruction INS2 is not registered in the holder 540, it is not detected that the dependency of the instruction INS1 and the instruction INS2 is cleared.

In a fifth cycle, processing of the PT cycle of the instruction INS1 is performed. In addition, in the fifth cycle, the selector 532A, for example, refers to the entry BCT of the bypass control table 440 and sets to "1" the ready flag R of the entry 524A in which the instruction INS2 is registered. In this manner, in the bypass utilizing the bypass control table 440, a determination on whether bypassing is possible is made in the two cycles of setting of the entry BCT (fourth cycle) and reading from the entry BCT (fifth cycle).

In a sixth cycle, processing of the BI cycle of the instruction INS1 is performed and processing of the PP cycle of the instruction INS2 are performed. Since the ready flag R of the entry 524A of the instruction INS2 is set to "1" in the fifth cycle, the priority order of the instruction INS2 is higher than the instruction INS (other instruction INS) registered in the entry 524A whose ready flag R is "0". Thus, for example, processing of copying information PID indicating the instruction INS2 or the like to the entry 542 of the holder 540 (processing of the PP cycle of the instruction INS2) is performed. Note that if the ready flags R of all the entries 542 in the holder 540 are "0", the information PID indicating the instruction INS2 or the like overwrites the entry 542 of the holder 540.

In a seventh cycle, since the ready flag R of the entry 542 of the instruction INS2 is "1", processing of the P cycle of the instruction INS2 is performed. Note that in the example illustrated in FIG. 9, no instruction INS with a higher priority order than the instruction INS2 is registered in the holder 540 in the seventh cycle. Thus, in the seventh cycle, processing of the P cycle of the instruction INS2 is performed. In addition, in the seventh cycle, processing of the B2 cycle of the instruction INS1 is performed.

In an eighth cycle, processing of the X cycle of the instruction INS1 is performed and processing of the P cycle of the instruction INS2 are performed. In and after a ninth cycle, processing of the B1 cycle, the B2 cycle, and the X cycle of the instruction INS2 is sequentially performed.

In this manner, even in a case where there is no empty entry in the holder 540 and the ready flags R of all the entries 542 are "0" when the dependency of the instruction INS1 and the instruction INS2 is cleared, processing of the PP cycle of the instruction INS2 is preferentially performed. This enables the arithmetic processing device 100 to keep the executable instruction INS2 from staying in the holder 522A.

As described above, even in the embodiment illustrated in FIG. 2 to FIG. 9, the effect similar to the embodiment illustrated in FIG. 1 may be achieved. For example, even if the number of instructions INS held in the reservation stations 500, 600 increases, a decrease in the efficiency of processing the instructions INS may be suppressed.

The detailed description above will reveal characteristics and advantages of the embodiments. This is to intend that the claims cover the characteristics and advantages of the embodiments as described above as far as the claims do not deviate from the spirit and the scope of the claims. In addition, a person having ordinary skill in the art may easily be able to conceive any modifications and changes. Therefore, there is no intention to limit the scope of the embodiments having inventiveness to what has been described above, and it is also possible to rely on appropriate improvements and equivalents included in the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
    an instruction decode unit configured to decode instructions;
    an instruction execution unit configured to execute the decoded instructions; and
    an instruction hold unit configured to register the decoded instructions and sequentially input executable instructions among the registered instructions to the instruction execution unit, wherein
    the instruction hold unit includes
    a first holder including a plurality of first entries each configured to hold a decoded instruction;
    a second holder including a smaller number of second entries than the number of the first entries, the second holder configured to register some of the instructions held in the first entries;
    a first selector configured to select an instruction to be registered in the second holder from instructions held in the first entries and to store identification information that identifies the selected instruction into any of the second entries; and
    a second selector configured to sequentially select an executable instruction from instructions registered in the second holder, input the selected executable instruction to the instruction execution unit, and to detect a dependency between the instruction inputted to the instruction execution unit and the instructions registered in the second holder.

2. The arithmetic processing device according to claim 1, wherein if there is no executable instruction in the instructions held in the first entries and not registered in the second holder, the first selector selects, as an instruction to be registered in the second holder, an instruction decoded earliest by the instruction decode unit among the instructions held in the first entries and not registered in the second holder.

3. The arithmetic processing device according to claim 1, wherein the second holder includes a plurality of the second entries.

4. The arithmetic processing device according to claim 3, wherein
    each of the first entries holds registration information indicating that the instruction held in the first entry is registered in the second holder or not, and
    in a case where there is no empty entry in the second entries, where any of the instructions registered by the second holder is not executable, and where any of the instructions held in the first entries transitions to an executable state before any of the instructions registered by the second holder transitions to an executable state, the first selector overwrites any of the second entries with the identification information indicating the instruction that has transitioned to the executable state.

5. The arithmetic processing device according to claim 3, further comprising a third selector configured to receive from the first entries third information of first information included in each of the instructions decoded by the instruction decode unit but excluding second information to be used in detection of an inter-instruction dependency, and transfer the third information of the instruction to be inputted to the instruction execution unit to the instruction execution unit, wherein
    when registering an instruction in the second holder, the first selector stores the second information, included in the instruction, in any of the second entries, and
    when inputting an instruction to the instruction execution unit, the second selector transfers to the instruction execution unit the second information of the instruction selected as the instruction to be inputted to the instruction execution unit.

6. The arithmetic processing device according to claim 3, wherein
    the first holder further includes a plurality of third holders, each including a predetermined number of the first entries, and
    the first selector selects an instruction to be registered in the second holder from the third holders, and registers an instruction to the second holder from each of the third holders.

7. A processing method of an arithmetic processing device including an instruction decode unit configured to decode instructions, an instruction execution unit configured to execute the decoded instructions, and an instruction hold unit having a first holder including a plurality of first entries configured to register the decoded instructions, sequentially input the registered instructions to the instruction execution unit in order of first-ready first out, and hold the decoded instruction, the method comprising:
    by a first selector included in the instruction hold unit, selecting an instruction to be registered in a second holder having a smaller number of second entries than the number of the first entries, from the instructions held in the first entries;
    by the first selector, storing identification information indicating the selected instruction in the second entries;
    by a second selector included in the instruction hold unit, sequentially selecting an executable instruction from instructions registered in the second holder, and inputting the selected executable instruction to the instruction execution unit; and
    by the second selector, detecting a dependency of the instruction inputted to the instruction execution unit and the instructions registered in the second holder.

* * * * *